(12) United States Patent
Kang et al.

(10) Patent No.: US 11,022,569 B2
(45) Date of Patent: Jun. 1, 2021

(54) LOW-ANGLE SELF-SWINGING, LARGE-SCALE MULTI-SLICE SPIRAL COMPUTED TOMOGRAPHY APPARATUS AND INSPECTION METHOD

(71) Applicant: Nuctech Company Limited, Beijing (CN)

(72) Inventors: Kejun Kang, Beijing (CN); Zhiqiang Chen, Beijing (CN); Yuanjing Li, Beijing (CN); Li Zhang, Beijing (CN); Ziran Zhao, Beijing (CN); Yaohong Liu, Beijing (CN); Jianping Gu, Beijing (CN); Liang Li, Beijing (CN); Yuxiang Xing, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 46 days.

(21) Appl. No.: 16/029,896

(22) Filed: Jul. 9, 2018

(65) Prior Publication Data
US 2018/0328866 A1    Nov. 15, 2018

Related U.S. Application Data

(63) Continuation of application No. 14/837,205, filed on Aug. 27, 2015, now abandoned.

(30) Foreign Application Priority Data

Aug. 27, 2014 (CN) .......................... 201410427466.X (51) Int. Cl.
*G01N 23/046* (2018.01)
*G01V 5/00* (2006.01)

(52) U.S. Cl.
CPC .......... *G01N 23/046* (2013.01); *G01V 5/005* (2013.01)

(58) Field of Classification Search
CPC .............. G01V 5/005; G01N 2223/33; G01N 2223/3304; G01N 23/10; G01N 23/046; G06T 2207/30112; A61B 6/027
See application file for complete search history.

(56) References Cited

U.S. PATENT DOCUMENTS 3,852,611 A * 12/1974 Cesar .................. A61B 6/04
378/27
4,464,775 A *  8/1984 Yamagishi ............ A61B 6/032
378/11

(Continued)

FOREIGN PATENT DOCUMENTS

CN       85101211 A    1/1987
CN      101683271 A    3/2010

(Continued)

OTHER PUBLICATIONS

Extended European Search Report for corresponding European Patent Application No. 15182644.3 dated Jan. 21, 2016.

*Primary Examiner* — Dani Fox
*Assistant Examiner* — Soorena Kefayati
(74) *Attorney, Agent, or Firm* — Browdy and Neimark, PLLC (57) ABSTRACT

A low-angle self-swinging type computed tomography (CT) device is provided, having an X-ray accelerator and a plurality of rows of detectors and includes a slip ring, such that the slip ring with the accelerator and the detectors thereon is capable of performing a single-pendulum reciprocating movement while an object to be inspected passes through the slip ring, a three-dimensional CT image of the object is displayed, thereby achieving accurate inspection for large-scale objects, such as van containers.

9 Claims, 4 Drawing Sheets

(56) References Cited

U.S. PATENT DOCUMENTS

| | | | | |
|---|---|---|---|---|
| 4,885,761 A * | 12/1989 | Sones | A61B 6/105 378/197 |
| 5,966,422 A * | 10/1999 | Dafni | A61B 6/032 378/15 |
| 6,611,575 B1 * | 8/2003 | Alyassin | A61B 6/4476 378/37 |
| 6,735,271 B1 * | 5/2004 | Rand | A61B 6/032 378/15 |
| 6,735,274 B1 * | 5/2004 | Zahavi | A61B 6/032 378/15 |
| 7,239,684 B2 | 7/2007 | Hara et al. | |
| 7,260,173 B2 | 8/2007 | Wakayama et al. | |
| 7,324,625 B2 | 1/2008 | Eilbert | |
| 7,332,722 B1 * | 2/2008 | Tran | A61B 6/037 250/363.09 |
| 7,863,574 B2 * | 1/2011 | Hahn | G06T 5/50 250/363.05 |
| 8,340,245 B2 * | 12/2012 | Herranz | G01V 5/005 378/57 |
| 9,389,190 B2 * | 7/2016 | Tsuyuki | A61B 6/0407 |
| 9,480,438 B2 | 11/2016 | Sakaguchi et al. | |
| 2002/0037068 A1 * | 3/2002 | Oikawa | A61B 6/027 378/15 |
| 2003/0215055 A1 * | 11/2003 | Ozawa | A61B 6/504 378/62 |
| 2004/0101097 A1 * | 5/2004 | Wakayama | G01N 23/046 378/57 |
| 2005/0117700 A1 * | 6/2005 | Peschmann | G01V 5/00 378/57 |
| 2006/0002512 A1 * | 1/2006 | Cho | A61B 6/032 378/84 |
| 2006/0126772 A1 * | 6/2006 | Hu | G01V 5/005 376/156 |
| 2006/0237653 A1 * | 10/2006 | Popescu | G01T 1/201 250/367 |
| 2007/0053479 A1 * | 3/2007 | Sadatomo | A61B 6/035 378/4 |
| 2007/0183557 A1 * | 8/2007 | Manzke | A61B 6/035 378/4 |
| 2007/0237286 A1 * | 10/2007 | Imai | A61B 6/541 378/4 |
| 2007/0269006 A1 * | 11/2007 | Safai | B64F 5/60 378/57 |
| 2008/0144764 A1 * | 6/2008 | Nishide | A61B 6/542 378/5 |
| 2008/0247504 A1 * | 10/2008 | Edie | A61B 6/4035 378/9 |
| 2009/0161817 A1 | 6/2009 | Schlomka | |
| 2011/0058646 A1 * | 3/2011 | Herranz | G01N 23/04 378/19 |
| 2011/0062354 A1 * | 3/2011 | Pettinato | H05G 1/26 250/522.1 |
| 2013/0177129 A1 * | 7/2013 | Suzuki | G01N 23/046 378/4 |
| 2013/0188768 A1 * | 7/2013 | Lee | F16C 32/06 378/4 |
| 2013/0208866 A1 | 8/2013 | Bergfjord | |
| 2013/0266115 A1 | 10/2013 | Fan et al. | |
| 2014/0192960 A1 * | 7/2014 | Sakaguchi | A61B 6/461 378/98.2 |
| 2014/0198897 A1 * | 7/2014 | Sakaguchi | A61B 6/022 378/37 |
| 2014/0205061 A1 * | 7/2014 | Sakaguchi | A61B 6/466 378/41 |
| 2014/0321602 A1 * | 10/2014 | Sharpless | A61B 6/035 378/4 |
| 2015/0092908 A1 * | 4/2015 | Yanagita | F16C 17/107 378/4 |
| 2015/0182175 A1 | 7/2015 | Handa et al. | |
| 2015/0208993 A1 | 7/2015 | Stoutenburgh et al. | |
| 2015/0253435 A1 * | 9/2015 | Yamazaki | A61B 6/56 378/4 |
| 2015/0327816 A1 * | 11/2015 | Kakinuma | A61B 6/547 378/20 |
| 2016/0213336 A1 | 7/2016 | Kim et al. | |
| 2016/0219685 A1 * | 7/2016 | Garzon | A61B 6/035 |
| 2016/0345916 A1 * | 12/2016 | Lim | A61B 6/14 |

FOREIGN PATENT DOCUMENTS

| | | |
|---|---|---|
| CN | 102188779 A | 9/2011 |
| CN | 102853800 A | 1/2013 |
| CN | 204064976 U | 12/2014 |
| EP | 2618021 A2 | 7/2013 |
| JP | 5459519 B2 | 4/2014 |
| WO | 2010141101 A1 | 12/2010 |

* cited by examiner

LOW-ANGLE SELF-SWINGING, LARGE-SCALE MULTI-SLICE SPIRAL COMPUTED TOMOGRAPHY APPARATUS AND INSPECTION METHOD

CROSS-REFERENCE TO RELATED APPLICATIONS

This application claims the benefit of Chinese patent application No. 201410427466.X, filed on Aug. 27, 2014 with State Intellectual Property Office of China, and the disclosures of which are incorporated herein in its entirety by reference.

BACKGROUND OF THE INVENTION

Field of the Invention

The present invention relates to the field of computed tomography (CT) inspection for air containers, and particularly, to a low-angle self-swinging type, large scale multi-slice spiral computed tomography (CT) inspection apparatus and an inspection method.

Description of the Related Art

Conventional CT technologies have been gradually replaced by the spiral computed tomography (CT) technology due to its enormous advantages. Compared to conventional CT technologies, the spiral computed tomography (CT) technology is advantageous in that it can continuously collect projection data and thus obtain a three-dimensional image of an object through a specialized reconstruction algorithm based on the collected data, thereby greatly reducing CT scanning period time, improving resolution of the reconstructed image in Z-axis, and reducing movement artifact.

The main differences between the multi-slice spiral CT technology and the single-slice spiral CT technology are in that the multi-slice spiral CT technology has multiple rows of detectors and thus can collect projection data of multiple layers of cone beams simultaneously, while the single-slice spiral CT technology has a single row of detectors and thus can only obtain projection data of a single layer of sector-shaped beam at a time. Thus, compared to the single-slice spiral CT technology, the multi-slice spiral CT technology has greatly enhanced performance, including largely increased covering scope of X-ray beams, effectively improved utilization of X-rays, reduced scanning time and ability to obtain three-dimension reconstruction image with higher quality. The current multi-slice spiral CT technologies have a scanning speed of more than three cycles per second and have been used in wide applications. The multi-slice spiral CT technology has been also used in combination with new technologies such as computer-aided surgery, virtual endoscope technology and adjuvant radio therapy, and the like.

However, the conventional multi-slice spiral CT system has many shortages yet. The conventional multi-slice spiral CT system occupies a large space and has a complex structure, and its X-ray source lacks strong penetration ability. Further, the conventional multi-slice spiral CT system uses a slip ring that is configured to continuously rotate at high velocity, and further, to transfer power from supply source to an X-ray machine and a plurality of rows of detectors. In particular, when a plurality of rows of detectors are used, a large amount of projection data produced during scanning need to be wirelessly transmitted to a computer which is located away from the slip ring. In this instance, the slip ring and the communication parts are largely complicated in structure and cost is largely increased. If an accelerator and a large-scale detector that need high power supply are used, the system is hard to work.

SUMMARY OF THE INVENTION

It is thus an object of the present disclosure to overcome or address one or more of problems existing in prior arts, and to provide a low-angle self-swinging type computed tomography apparatus, comprising.

an X-ray generator configured to emit X-rays toward an object to be inspected;

a data acquisition sub-system configured to collect signals of the X-rays passing through the object for inspection;

a swinging support device, on which the X-ray generator and the data acquisition sub-system are arranged and spaced from each other, wherein the swinging support device is configured to be able to reciprocate in a swing way with the X-ray generator and the data acquisition sub-system carried thereon while the object to be inspected is located in or passing through an inspecting region between the X-ray generator and the data acquisition sub-system.

According to an aspect of the present invention, there is provided an inspection method using the above computed tomography apparatus, comprising:

emitting X-rays by using the X-ray generator and collecting signals of the X-rays by the data acquisition sub-system for inspection, while operating the swinging support device such that the X-ray generator and the data acquisition sub-system reciprocate in a swinging way together with the swinging support device.

DETAILED DESCRIPTION OF PREFERRED EMBODIMENTS OF THE INVENTION

Figure 1:
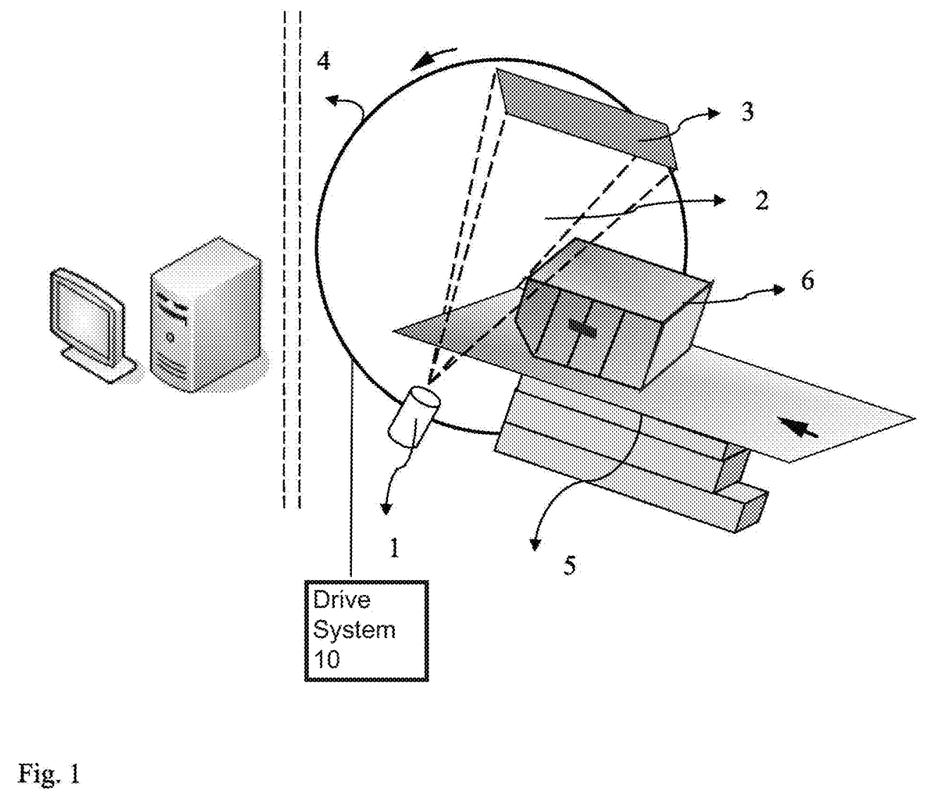
FIG. 1 is a schematic view of scanning operations of a low-angle self-swinging type, large-scale multi-slice spiral CT apparatus according to an embodiment of the present invention.
Figure 2:
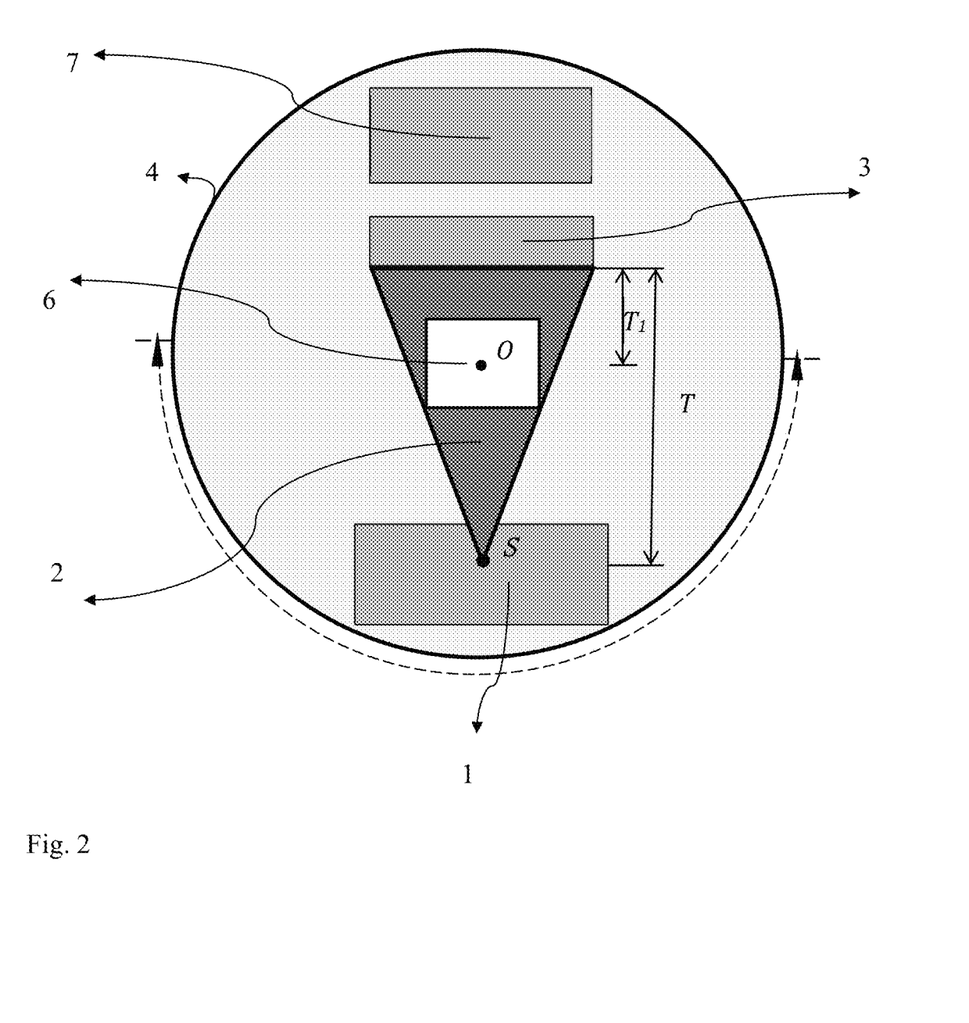
FIG. 2 is a partial sectional view of a slip ring of a low-angle self-swinging type, large-scale multi-slice spiral CT apparatus according to an embodiment of the present invention.

Reference to embodiments of the present invention is provided in detail with reference to the accompanying drawings, in which the same reference numbers represent same elements. The embodiments of the present invention will be described with reference to the accompanying drawings. FIGS. 1 and 2 schematically illustrate an apparatus according to an embodiment of the present invention.

An embodiment of the present invention provides a low-angle self-swinging type, large-scale multi-slice spiral computed tomography (CT) apparatus, which has an X-ray source, e.g., an X-ray accelerator, and a plurality of rows of detectors, and which collects full projection data required for reconstructing a CT image of an object to be inspected by scanning the object through a reciprocating rotation movement within 180 degrees, and provides a three-dimension tomogram of the scanned object using corresponding CT reconstructing and data processing technologies.

According to an embodiment of the present invention as shown in FIG. 1, there is provided a low-angle self-swinging type, large-scale multi-slice spiral CT apparatus. The CT apparatus includes an X-ray generator 1 configured to emit X-ray towards an object 6 to be inspected, and a data acquisition sub-system 3 configured to collect X-ray signals passing through the object 6 to be inspected. The CT apparatus further includes a swinging support device, on which the X-ray generator 1 and the data acquisition sub-system 3 are mounted and spaced from each other, wherein the swinging support device is configured to be able to reciprocate in a a swinging way with the X-ray generator 1 and the data acquisition sub-system 3 carried thereon.

In an embodiment, the X-ray generator 1 includes an X-ray accelerator source 1 and corresponding accessory equipments. Since a van container is large in volume, it is hard to inspect such a van container by using an X-ray generator in prior arts. In the embodiment of the present invention, the X-ray accelerator 1 may transmit high-power and larger energy X-rays 2 so as to scan and inspect a van container 6. The X-ray accelerator 1 is configured to accelerate electrons to impinge a target so as to generate X-rays 2, thereby providing a high-power cone or sector-shaped X-ray beam 2.

According to an embodiment, the X-ray generator 1 may be arranged on the swinging support device 4 and perform a reciprocating movement, such as simple-pendulum type swinging movement, together with the support device 4. A swinging amplitude of the support device 4 may not exceed 180 degrees. The swinging amplitude of the support device 4 may be any angle within 180 degrees. FIG. 2 illustrates a schematic view of the apparatus, in which a slip ring performs a reciprocating movement at a swinging amplitude of 180 degrees.

According to an embodiment, the swinging support device 4 may be a slip ring 4, wherein the X-ray generator 1 and the data acquisition sub-system 3 are respectively arranged on circumference of the slip ring, opposite to each other about a center of the slip ring. The swinging amplitude of the swinging support device 4 may not exceed 180 degrees.

Preferably, the swinging amplitude of the swinging support device 4 is equal to or less than 180 degrees. In prior arts, a support device is often arranged to rotate continuously for 360 degrees in order to fully scan an object. However, the slip ring 4 in the embodiment of the present invention is advantageously configured to rotate or swing within 180 degrees or less, i.e., at a reduced swinging amplitude/angle. The reduced pendular amplitude or angle leads to a simplified structure of the apparatus, which is particularly favor of an apparatus used for inspecting a van container. It is known that an X-ray accelerator has a very large volume and huge weight and thus is usually used in prior art in manner of fixation, because it is difficult to support and drive such a large X-ray accelerator to perform any movement. In order to support and drive the large X-ray accelerator, a large frame and a high-power driving device are needed, which in turn result in an inspecting apparatus with a complex structure. Meanwhile, the associated equipments used for such an inspecting apparatus will be configured with high standards and thus would be hard to be implemented. The slip ring provided to move at a small angle according to embodiments of the present invention may lead to reduced power consumption and thus simplified corresponding driving system. Further, when the slip ring 1 supporting the X-ray accelerator 1 moves, a change in kinetic energy stood by the slip ring is significantly reduced, which thus reduces requirements of a support structure, enhances security of the support structure, and is economically advantageous. In addition, a reduced swinging range or amplitude of reciprocating movement of the slip ring 4 results in less irradiation dose received by the object to be inspected, which is particularly in favor of usage of the X-ray accelerator 1.

As the slip ring performs a reciprocating rotation movement within 180 degrees around the center, an intertwisting problem of connection lines for communication and power due to continuous rotation is avoided. In embodiments of the present invention, a larger amount of projection data collected by the rows of detectors during scanning may be communicated to a back-end data processor through optical cables or wires. Compared with wireless communication, communication through cables leads to higher transmission rate, higher signal-to-noise ratio and stronger electromagnetic interference resistance. It is also particularly advantageous for a large-scale apparatus to perform a swinging movement at a smaller amplitude or angle such that the cables connected to the swinging device, for example for information communication, are also moved in a smaller amplitude. In an embodiment, the slip ring may be swung in a reciprocating way in a range less than or equal to 150 degrees, or less than or equal to 120 degrees, or less than 100 or equal to degrees, or less than or equal to 90 degrees, or less than or equal to 70 degrees, or less than or equal to 60 degrees, or even in a much smaller range, to perform a scan and inspection of whole or part of an object to be inspected.

According to an embodiment, the data acquisition sub-system includes a plurality of rows of detectors or a detector array 3 that are arranged to cover a certain detection area or preset detection area. The detection area may be set according to actual situations. Detector units are arranged at a regular spacing, or arranged at an irregular spacing. The plurality of rows of detectors 3 are arranged to collect projection signals from a sector-shaped X-ray beam. The data acquisition sub-system further includes a read circuit and a logic control unit for converting the projection signals into projection data. The detectors may be solid detectors, scintillator detectors, gas detectors or semiconductor detectors.

The plurality of rows of detectors may be fixed on the support device 4, such as the rotatable slip ring. A larger amount of projection data collected by the plurality of rows of detectors during scanning may be communicated to back-end data processor through optical cables or wires. According to the embodiment, communication through cables enables higher transmission rate, higher signal-to-noise ratio and stronger signal transmission interference resistance. Meanwhile, technical difficulties and cost for the data acquisition may be largely reduced.

According to an embodiment, the support device 4 may be a circular slip ring 4, as shown in FIGS. 1 and 2. The X-ray generator 1 and the plurality of rows of detectors 3 are arranged on the slip ring and spaced from each other by 180 degrees, for example, fixed on the slip ring 4 to be opposite to each other with respect to the centre of the slip ring 4. The detectors 3 may be fixed on an inner side of the slip ring, as shown in FIG. 2. In FIG. 2, a flare angle of the sector-shaped X-ray beam and an effective detecting area of the plurality of rows of detectors may be determined depending on a size of a desired region to be imaged by X-ray scanning. It is appreciated by those skilled in the art that, according to embodiments of the present invention, although scan is performed by the reciprocating swinging movement of the X-ray generator 1 and the corresponding detectors 3 within 180 degrees, a desirable inspection result can be obtained to meet actual requirements according to the scanning signals.

According to an embodiment, an electrical driving system 10 is provided to power the slip ring 4, so as to control the slip ring 4 to rotate within a certain amplitude/angle. Meanwhile, the X-ray generator 1 is controlled to emit pulsed X-rays 2 at a constant frequency, and the plurality of rows of detectors are driven to collect projection data.

According to an embodiment, it is particularly advantageous to utilize an eccentric weight distribution of the apparatus to perform scanning in a single-pendulum movement. Specifically, for example, since the X-ray accelerator 1 is heavier, the center of gravity of the whole slip ring is nearer the X-ray accelerator 1 than the detectors, i.e., offset from the circle center of the slip ring. With this configuration, a single-pendulum type slip ring is created. Assuming a distance between the center of gravity and the circle center of the circle slip ring is L, a swinging period is $T=2\pi\sqrt{L/g}$. With a less power from the electrical driving system, the slip ring 4 may swing periodically at a constant amplitude. With the embodiments of the present invention, nature energy due to gravity and the principle of movement of a single-pendulum are utilized to eliminate complex driving mechanism and to achieve a reciprocating swinging movement of the slip ring with a small actuating force so that the slip ring 4 is swung at constant amplitude. In addition, the X-ray source 1 and the detectors 3 are associated to operate under control of a clock, which leads to a simplified control device and thus enables the slip ring 4 to have a simple and compact structure, saving cost. According to the embodiment of the present invention, the slip ring 4 is configured to have a center of gravity offset from its circle center and thus may perform a single-pendulum movement under a small actuating force, which may not only simplify the driving device for the apparatus, but also facilitate to combine the single-pendulum movement of the slip ring 4 with emitting operation of X-ray generator, such that the apparatus may determine and record time of each emitting operation, and calculate the scanning angle corresponding to the time of emitting operation. As such, the whole apparatus may be significantly simplified in structure, produced at low cost and improved to have an increased reliability, achieving great economic interest/effect. It is a huge commercial advantage with respect to construction and operation for an apparatus with a large volume and huge weight that a rather small actuating force is only needed to achieve scanning operation.

According to an embodiment of the present invention, the accelerator is triggered to emit X-ray at a constant frequency, instead of being triggered through a grating scale due to an irregular angular velocity of a swinging movement of the grating scale, and the data acquisition sub-system is also configured to collect the projection data at the same frequency.

According to an embodiment, the slip ring 4 may be driven to move at a substantially constant linear velocity or angular velocity. That is, during most of travel of the reciprocating movement, the X-ray accelerator 1 and the data acquisition sub-system 3 are supported by the slip ring to rotate at a constant velocity, except performing acceleration and deceleration movements near either end of the travel. During this, the X-ray accelerator 1 emits X-ray 2 at a constant period, performing inspection. The slip ring 4 may be driven to perform a reciprocating movement at other velocities, which may be set by those skilled in the art as required.

According to an embodiment, the CT apparatus further includes a carrier 5 configured to carry the object 6 to be inspected to pass through an inspection region defined by the X-ray generator and the data acquisition sub-system. The carrier 5 may move linearly. For example, the carrier 5 may move linearly in two directions, i.e., lifting movement in an up-down direction and translation movement in a fore-and-aft direction. The lifting movement is provided to facilitate placement of the container 6 onto the carrier 5. Specifically, the carrier 5 may firstly descend to a suitable level, and then, after placement of the container 6 onto the carrier 5, lift up to a desired level where CT scan may be performed. Then, the carrier 5 translates to convey the container 6 through the CT scanning region at a constant velocity, completing a CT scan procedure. The translation velocity is determined according to period of the swinging movement of the slip ring and desired reconstruction image quality.

According to an embodiment, the CT apparatus further includes a control sub-system configured to control movement of the swinging support device 4 and operation of the X-ray generator and the data acquisition sub-system. The control sub-system is configured to control parts of the CT apparatus to cooperate with one another.

According to an embodiment, the CT apparatus further includes a data processing sub-system, configured to process projection data obtained by the data acquisition sub-system and reconstruct a three-dimension image of the object. The data processing sub-system may be, for example, a data processing computer for processing data, i.e., processing projection data obtained by the data acquisition sub-system, reconstructing the three-dimension image of the object, and showing the image on a display. The data processing sub-system may also be configured to control operations of the whole apparatus, including control of mechanical operation, control of electrical operation, control of safety chain, and the like. That is, when the CT apparatus is provided with the control sub-system and the data processing sub-system, they may be integrated together. The computer may be a single PC of high-performance, or a work station or computer group. The display may be a CRT display, or a liquid crystal display.

According to an embodiment, the control, data transmission, image reconstruction, and data processing of the whole apparatus are performed by a work station. Scan controlling data, position data and projection data are inputted to the work station by the data acquisition system and reconstructed therein to generate a transmission image, a tomographic image and a three-dimension image of the object, which are displayed on the display.

In addition, in the CT apparatus according to an embodiment of the invention, the projection data may be reconstructed by using a weighting function in combination with a conical beam filtering reverse projection method to generate a three dimension tomographic image, or reconstructed by combining an iteration method with the filtering reverse projection method.

According to the embodiment, data processing technology used in the CT apparatus includes hardening and scattering correction, metal artifact correction, and image processing and mode identification. In the low-angle self-swinging type, large-scale multi-slice spiral CT apparatus, since the X-ray accelerator 1 is used as an X-ray source and the X-ray beams are polychromatic, rather than monochromatic, a hardening effect occurs. The CT apparatus works based on X-ray transmission attenuation, however there is also a scattering effect in practice. Further, corresponding image processing and mode identification technologies, such as image enhancing technology, marginal check and computer-aided diagnosis, are also applied in the CT apparatus according to the embodiment of the present invention.

According to an embodiment of the present invention, in order to achieve accurate image reconstruction, the X-ray imaging system, i.e., the X-ray generator 1 and the data acquisition sub-system 3, may measure or calibrate following parameters of the apparatus: a distance T from the X-ray source point S to the detector, the position of the rotating center O of the slip ring, and a distance $T_1$ from the rotating center O to the detector, in which a connection line between the X-ray source point S and the rotating center O is perpendicular to a surface of the detector array, as shown in FIG. 2. Further, the X-ray imaging system may measure or calibrate a angle parameter of the position where the X-ray source point S is located at a time when the X-ray generator emits X-ray, and sizes of the plurality of detectors including a physical size of each detector and a size of the detector array. It is appreciated by those skilled in the art that an image of the inspected object may be produced based on the detected signals by using acknowledge in prior art.

Figure 3:
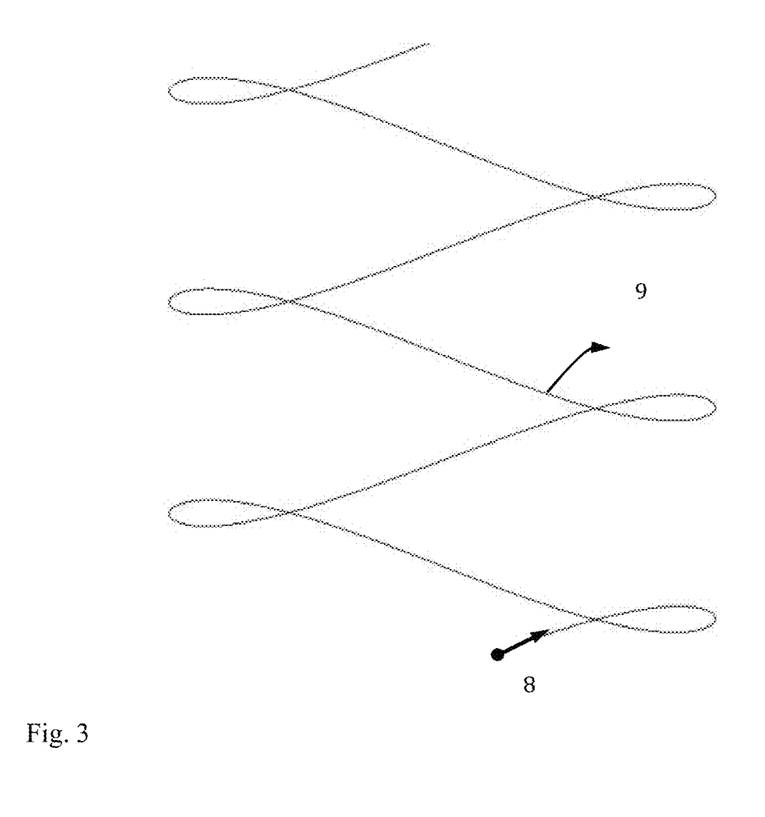
FIG. 3 is a schematic view of a scanning path of an X-ray source of a low-angle self-swinging type, large-scale multi-slice spiral CT apparatus according to an embodiment of the present invention, in which the scanning path of the X-ray source is a continuous non-smooth spiral folding line composed of sectionalized spiral line segments.
Figure 4:
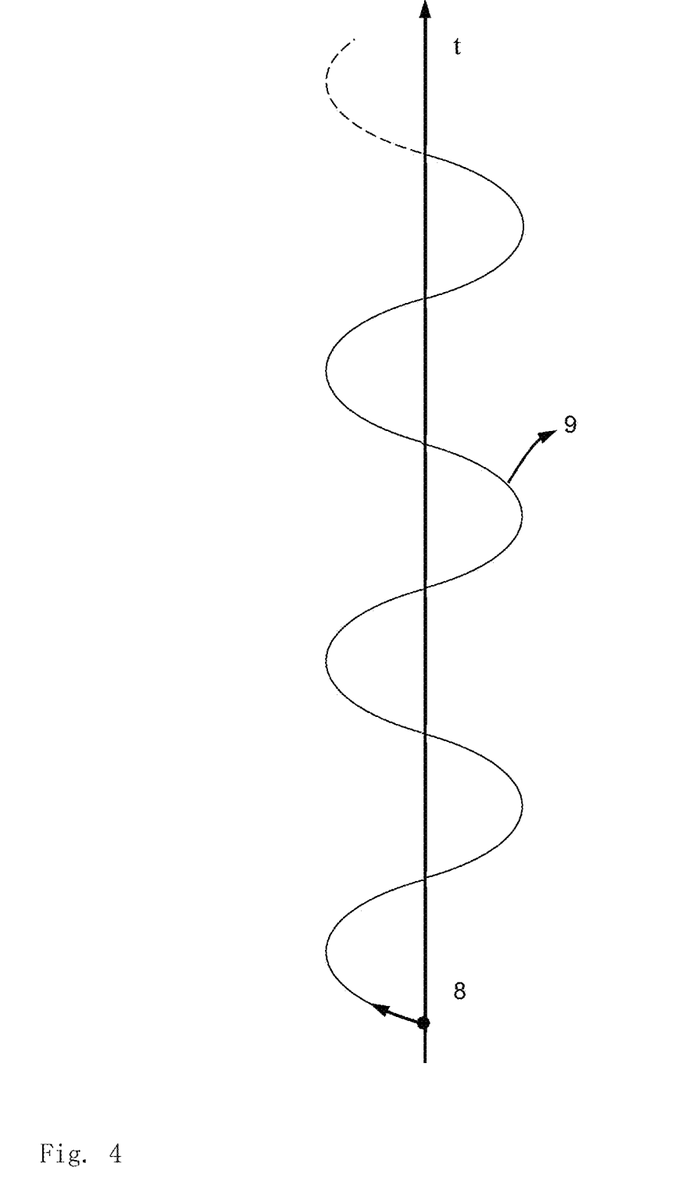
FIG. 4 is a schematic top view of a scanning path of an X-ray source of a low-angle self-swinging type, large-scale multi-slice spiral CT apparatus according to an embodiment of the present invention in the state that the X-ray source starts to scan from a point directly over Z-axis, wherein the scanning path of the X-ray source is a continuous non-smooth spiral folding line composed of sectionalized sine line-like segments.

In the low-angle self-swinging type, large-scale multi-slice spiral CT apparatus according to embodiments of the present invention, the X-ray generator 1 and the plurality of rows of detectors 3 are used to scan the object to be inspected through the reciprocating rotation movement within or not greater than 180 degrees and linear movement of the carrier with the object thereon, thereby achieving the whole scanning process. The X-ray source thus scans a container along a scanning path of spiral folding line 9. FIG. 3 shows a scanning path of the X-ray source, in which the startup point of the X-ray source is denoted by point 8. In the embodiment, the CT apparatus utilizes a scanning mode of reciprocating rotation movement and wire transmission mode of X-ray projection data, and thus is simplified in complexity, thereby reducing technical difficulty and manufacturing cost. Further, the self-swinging rotating mode and scanning at a constant interval may also simplify the control of the apparatus, in which time of emitting may be automatically determined and recorded and thus a scanning angle may be calculated. Also, the scanning mode according to the embodiment of the present invention may allow irradiation dose of the X-ray source imposed onto the inspected object during scanning may be largely reduced. The CT apparatus according to the embodiments of the present invention thus has a very high market application potentiality.

Purposes, technical solutions and advantageous effects of the present invention have been further illustrated in the above specific embodiments. It should be understood that the above description is merely used to illustrate specific embodiments of the present invention, but not to limit the present invention. All of changes, equivalent alternatives, improvements, made within principles and spirit of the disclosure, should be included within the scope of the present invention.

What is claimed is:

1. A low-angle self-swinging type computed tomography apparatus, comprising:
   an X-ray generator configured to emit X-rays towards an object to be inspected;
   a data acquisition sub-system configured to collect signals of the X-rays passing through the object for inspection;
   a slip ring comprising an annular slip ring connected to a support to rotate about an axis at a circle center of the annular slip ring, wherein the X-ray generator and the data acquisition sub-system are arranged on a circumference of the annular slip ring and located opposite to each other with respect to the circle center of the annular slip ring,
   an electrical driving system connected to the slip ring,
   wherein the slip ring is configured to be actuated by a small driving force from the electrical driving system to reciprocate in a swinging way with the X-ray generator and the data acquisition sub-system carried thereon while the object to be inspected is located in or passing through an inspecting region between the X-ray generator and the data acquisition sub-system,
   wherein a center of gravity of the annular slip ring is offset with respect to the circle center of the annular slip ring such that the slip ring, after actuation by the electrical driving system, moves responsive to a force of gravity and reciprocates in an irregular angular velocity and constant amplitude of a single pendular reciprocating motion.

2. The computed tomography apparatus according to claim 1, wherein the X-ray generator includes a large-power X-ray accelerator.

3. The computed tomography apparatus according to claim 1, wherein the X-ray generator is configured to provide an X-ray beam in a cone or sector shape.

4. The computed tomography apparatus according to claim 1, wherein the data acquisition sub-system comprises a plurality of rows of detectors.

5. The computed tomography apparatus according to claim 1, further comprising a carrier configured to carry the object to be inspected to pass through the inspecting region defined by the X-ray generator and the data acquisition sub-system.

6. The computed tomography apparatus according to claim 1, further comprising a control subsystem configured to control the movement of the slip ring and operations of the X-ray generator and the data acquisition sub-system.

7. The computed tomography apparatus according to claim 1, further comprising a data processing sub-system configured to process a projection data collected by the data acquisition sub-system to reconstruct a three dimension image of the object.

8. An inspection method using the computed tomography apparatus according to claim 1, comprising:
   emitting X-rays by using the X-ray generator and collecting signals of the X-rays by the data acquisition sub-system for inspection, while operating the slip ring such that the X-ray generator and the data acquisition sub-system reciprocate in a swinging way together with the slip ring while the object to be inspected is located in or passing through an inspecting region between the X-ray generator and the data acquisition sub-system, wherein the slip ring has a maximum swinging amplitude of no more than 180 degrees, wherein the center of gravity of the slip ring is offset with respect to the circle center of the annular slip ring.

9. The computed tomography apparatus according to claim 5, wherein the carrier is configured to be linearly movable in two directions, including an up-down direction and a fore-and-aft direction.

* * * * *